No. 793,823. PATENTED JULY 4, 1905.
A. CHRISTIANSON.
PASSENGER, BAGGAGE, OR LIKE CAR.
APPLICATION FILED AUG. 11, 1904.

WITNESSES. INVENTOR.

No. 793,823. PATENTED JULY 4, 1905.
A. CHRISTIANSON.
PASSENGER, BAGGAGE, OR LIKE CAR.
APPLICATION FILED AUG. 11, 1904.

WITNESSES. INVENTOR.

No. 793,823. PATENTED JULY 4, 1905.
A. CHRISTIANSON.
PASSENGER, BAGGAGE, OR LIKE CAR.
APPLICATION FILED AUG. 11, 1904.

WITNESSES. INVENTOR.

No. 793,823. PATENTED JULY 4, 1905.
A. CHRISTIANSON.
PASSENGER, BAGGAGE, OR LIKE CAR.
APPLICATION FILED AUG. 11, 1904.

WITNESSES. INVENTOR.

No. 793,823. PATENTED JULY 4, 1905.
A. CHRISTIANSON.
PASSENGER, BAGGAGE, OR LIKE CAR.
APPLICATION FILED AUG. 11, 1904.

WITNESSES. INVENTOR.

No. 793,823. PATENTED JULY 4, 1905.
A. CHRISTIANSON.
PASSENGER, BAGGAGE, OR LIKE CAR.
APPLICATION FILED AUG. 11, 1904.

WITNESSES. INVENTOR.

No. 793,823.

Patented July 4, 1905.

UNITED STATES PATENT OFFICE.

ANDREW CHRISTIANSON, OF BUTLER, PENNSYLVANIA, ASSIGNOR TO STANDARD STEEL CAR COMPANY, OF PITTSBURG, PENNSYLVANIA, A CORPORATION OF PENNSYLVANIA.

PASSENGER, BAGGAGE, OR LIKE CAR.

SPECIFICATION forming part of Letters Patent No. 793,823, dated July 4, 1905.

Application filed August 11, 1904. Serial No. 220,383.

*To all whom it may concern:*

Be it known that I, ANDREW CHRISTIANSON, a resident of Butler, in the county of Butler and State of Pennsylvania, have invented a new and useful Improvement in Passenger, Baggage, or Like Cars; and I do hereby declare the following to be a full, clear, and exact description thereof.

My invention relates to passenger, baggage, express, mail, and similar railway-cars, and more especially to such cars when constructed mostly or entirely of metal.

The object of my invention is to provide a metal car of the character specified which is strong and light, which has the appearance of an ordinary wooden car of this type, and which is capable of a high ornamental finish.

In the accompanying drawings, Fig. 12ª is a detail section through the end plate.

In the drawings I have shown my invention applied to a baggage-car. The same design, however, can be applied with only very slight modifications to express and mail cars and can be applied to passenger-cars by merely omitting the side doors and providing platforms at the ends of the cars. A baggage-car has been selected as a means of illustration, because it practically has all of the features of the other cars, having the side windows which are found in all cars of this type, the side doors which are found in baggage, express, and mail cars, and the end doors found in baggage and passenger cars. The only feature not present in a baggage-car which is found in any of these designs is the end platform of passenger-cars.

My car is designed to be constructed mostly or entirely of metal. Preferably, however, wood will be employed for the interior finish, this being desirable especially in passenger-cars and may also be employed in the other types of cars, or a metal interior or lining may be employed in baggage, express, and mail cars with a wooden exterior finish, or in these last-named cars both the interior and exterior may be of metal.

The underframe is largely of a standard design heretofore in use in flat and box cars, being merely modified to adapt it to six-wheeled trucks. The end-sill construction, however, is novel. The underframe shown includes two center sills 1, being of built-up plate-girder type having vertical web-plates 2, tapering from their middles toward their ends and strengthened at their upper edges by an angle-bar 3 and at their lower edges by a pair of angle-bars 4.

The car side frames are so built as to carry a considerable portion of the load, thus dispensing with separate side sills. The side frames consist of a lower flanged member or chord, shown as an angle-bar 5, a top chord, also forming the plate and composed of a flanged member, shown as an angle-bar 6, together with vertical connecting members or posts 7 and suitable connecting means. Interposed between the posts 7 at the floor-line of the car are sections of angle-bar 8, placed with their horizontal flange projecting inwardly and having riveted to said flange the floor-plates 9. A metal plate 10 is riveted to the lower chord 5, posts 7, and angle-bars 8, either externally or internally of the car, depending upon the finish thereof, and projecting up to the bottoms of the windows, this plate extending continuously either for the entire length of the car or at least between the side doors. The upper edge of this plate is riveted to a belt-rail, comprising sections of angle-bar 11, secured between the posts by knee-pieces or other connecting means. The plate 10, in effect, forms the web of a plate-girder and together with the horizontally-arranged angle-bars and vertical posts forms a girder of strength sufficient to carry a considerable part of the load.

Figures 17, 18:
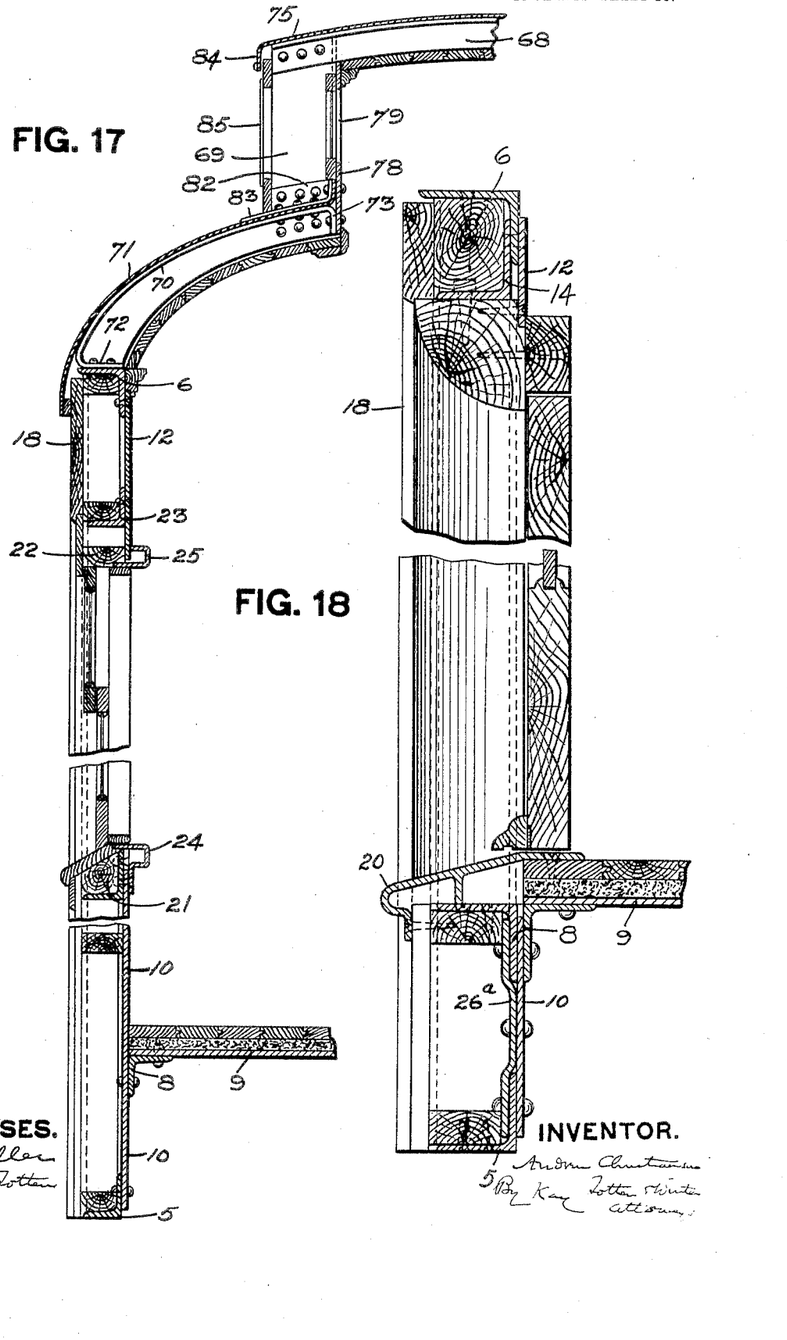
Figs. 17 and 18 are views similar to Figs. 15 and 16, showing a metal interior finish and wooden exterior finish.

Between the windows and doors above the belt-rail 11 are placed other plates 12, either to give an exterior finish, as in Figs. 1 to 16, or for an interior finish, as shown in Figs. 17 and 18. Where side doors are provided, I add a short section of flanged bar 14, extending between two of the posts and forming the upper side of the door-opening. The flanged bar 14 may be riveted directly to the plate 6, as shown in Fig. 18, or may be spaced therefrom, as in Fig. 16. In the latter case an additional plate 26 is preferably used to unite the two angle-bars in order to give additional strength to the side frame at the door-opening. A similar plate 26ª may also be employed below the door-opening and riveted to the angle-bars 5 and 8. The door-posts 15 extend between the bar 14 and a section of angle-bar 8, which forms, in effect, the sill of the door-opening.

Figure 13:
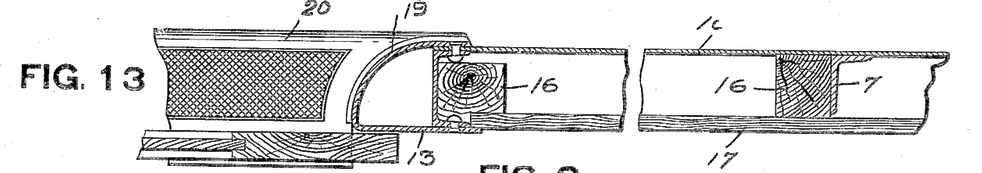
Fig. 13 is a section similar to the upper portion of Fig. 3, showing the parts on an enlarged scale.
Figure 14:
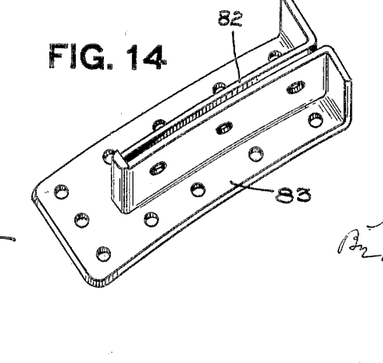
Fig. 14 is a perspective of the flashing-casting.
Figures 15, 16:
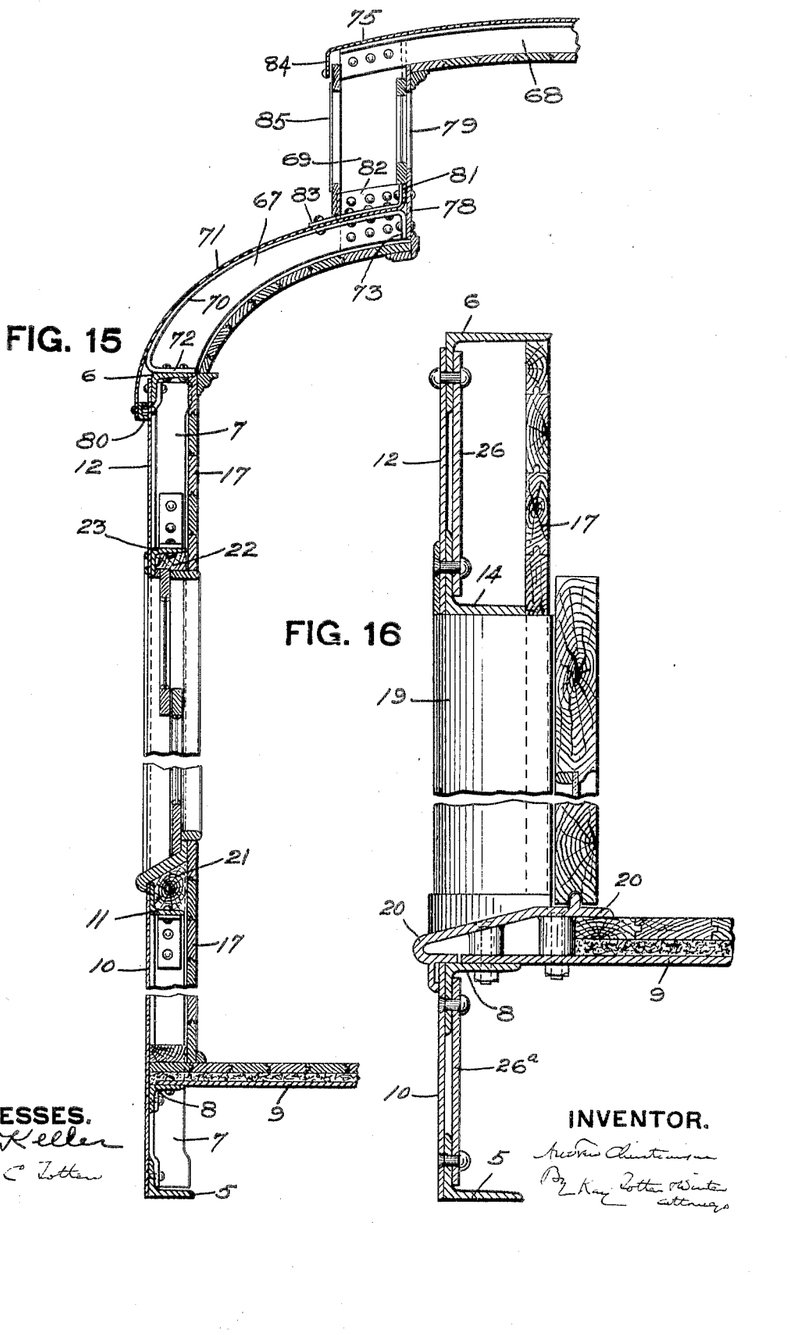
Fig. 15 is a vertical section through the car side, showing a wooden interior finish and metal exterior finish, the section being taken through one of the windows.
Fig. 16 is a detail section of the same arrangement, taken through the door.

The posts 7 preferably are angle-bars, as shown, and will have secured thereto a wooden strip 16 for receiving the wooden lining 17, as shown in Figs. 15 and 16, or the wooden exterior finish 18, as shown in Figs. 17 and 18. The posts at the doors and windows, however, will preferably be channel-bars, as shown, and also provided with a wooden nailing-strip. The finish at the sides of the door and window openings is given by a pressed-metal plate 19 of modified U shape (shown clearly in Fig. 13) and having the edges thereof riveted to the flanges of the channel-posts.

Suitable sills 20, preferably cast, will be provided at the door-openings. At the window-openings a wooden block 21 is placed on the belt-rails 11 to form the window-sill, and at the top of the opening a similar wooden filling-piece 22 will be secured to sections of angle-bar 23, secured between the posts. When the interior of the car has a wooden finish, the frame around the window may be built as usual. When, however, a metal interior is employed, as shown in Figs. 17 and 18, the window-sill is formed of a metal plate or casting 24, and at the upper portion of the window a corresponding metal plate or casting 25 is employed.

Figure 7:
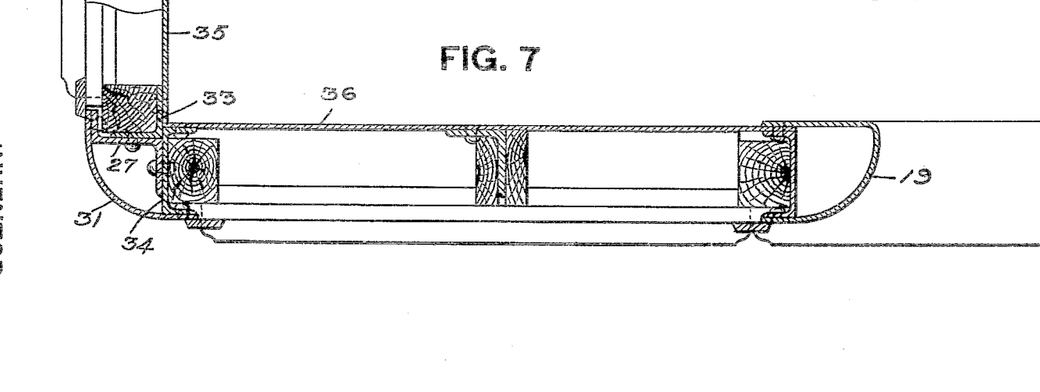
Fig. 7 is a similar view showing a modification.

The corner-posts consist of Z-bars 27, having an angle-bar 28 riveted to one edge thereof, thus providing two flanges 29 and 30, projecting at right angles to each other and having secured thereto the curved metal finishing-sheet 31, thus giving to the corner of the car the usual curved appearance. The projecting flanges 28 and 30 also serve as a convenient means for having riveted thereto the external side plates 10 12 and end plates 32. When the car is to be provided with a metal interior finish, the Z-bar 27 has riveted to its web near its inner angle an angle-bar 33 and to its inner leg or flange a channel-bar 34, as shown in Fig. 7. The outer flange of the channel-bar 34 and the outer flange of the Z-bar serve in this case for the securing means of the corner finishing-plate 31, while the angle-bar 33 and inner flange of the channel-bar 34 serve as a convenient means for securing in place the interior side plates 35 and end plates 36.

Figure 1:
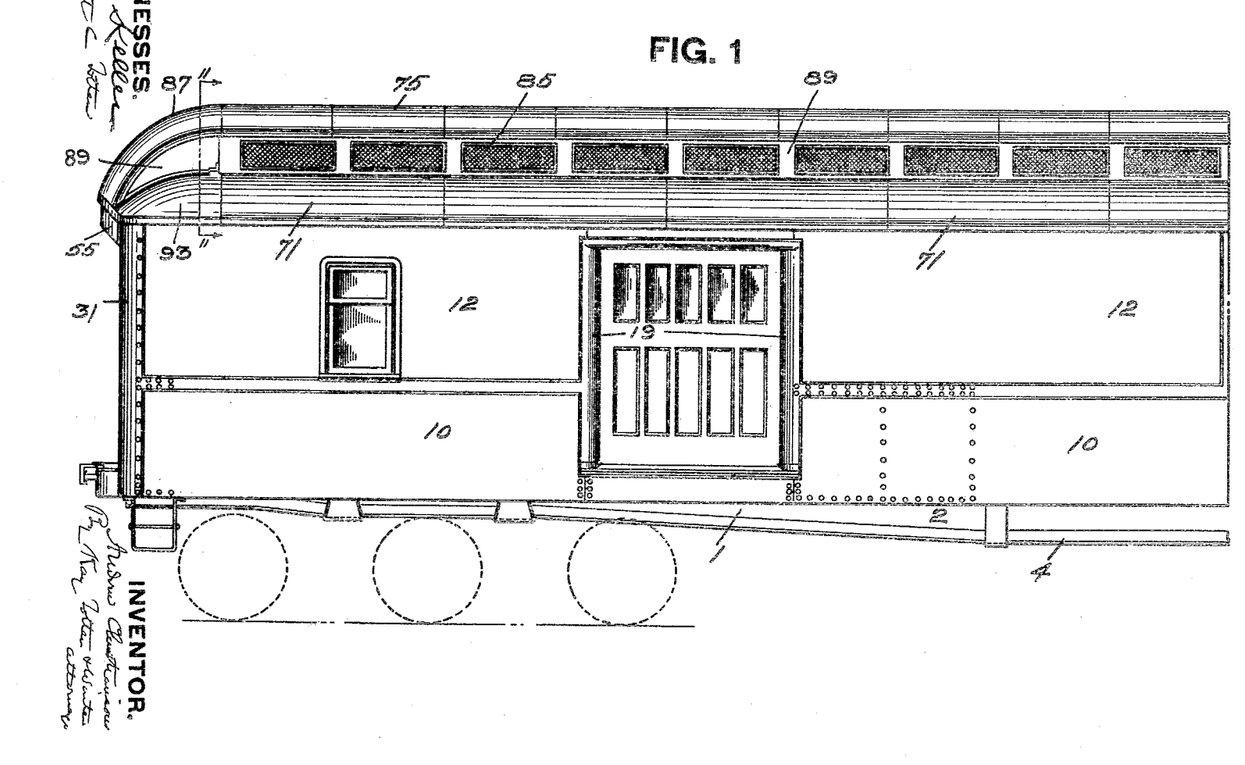
Figure 1 is a side view of one-half of a car constructed according to my invention.
Figure 2:
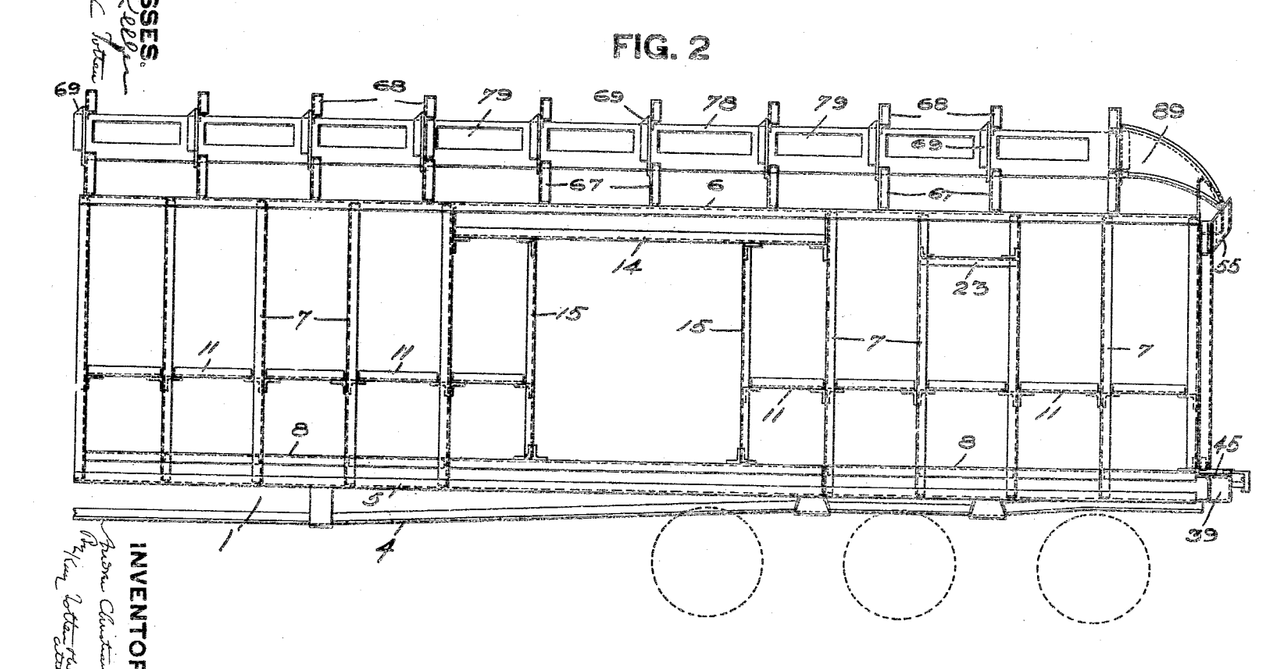
Fig. 2 is a side view of the framing thereof.
Figures 3, 19, 20:
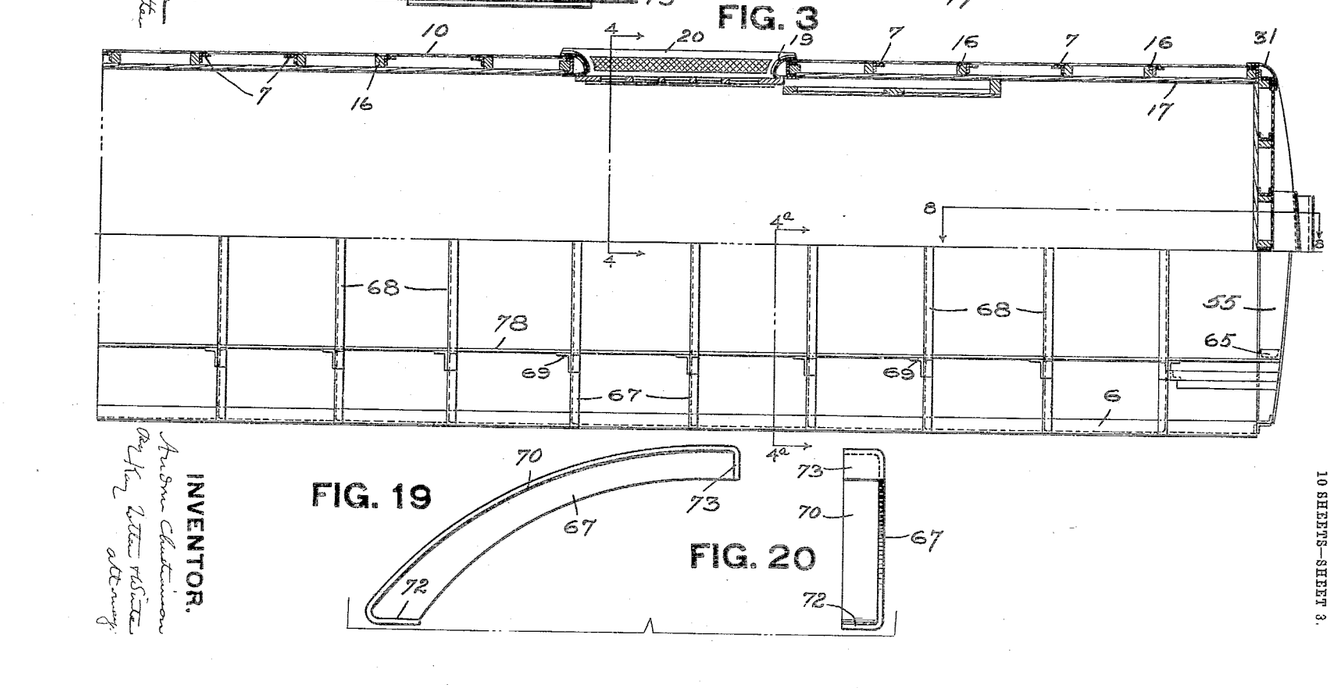
Fig. 3 on its lower portion is a plan view showing the roof-plates removed and on its upper portion is a horizontal section on the line 3 3, Fig. 4.
Figs. 19 and 20 are respectively side and end views of the lower-deck carline member.
Figure 4:
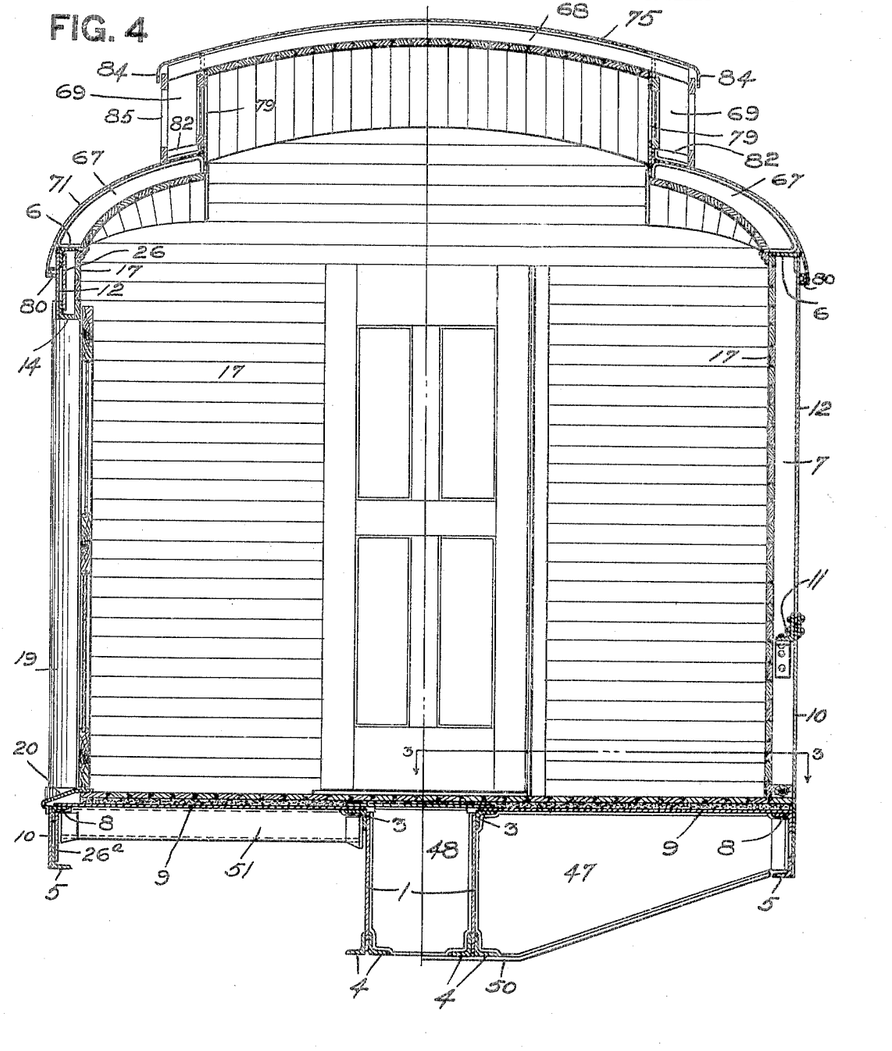
Fig. 4 is a cross-section taken on its left-hand portion on the line 4 4, Fig. 3, and on its right-hand portion on the line 4ª 4ª, Fig. 3.
Figure 5:
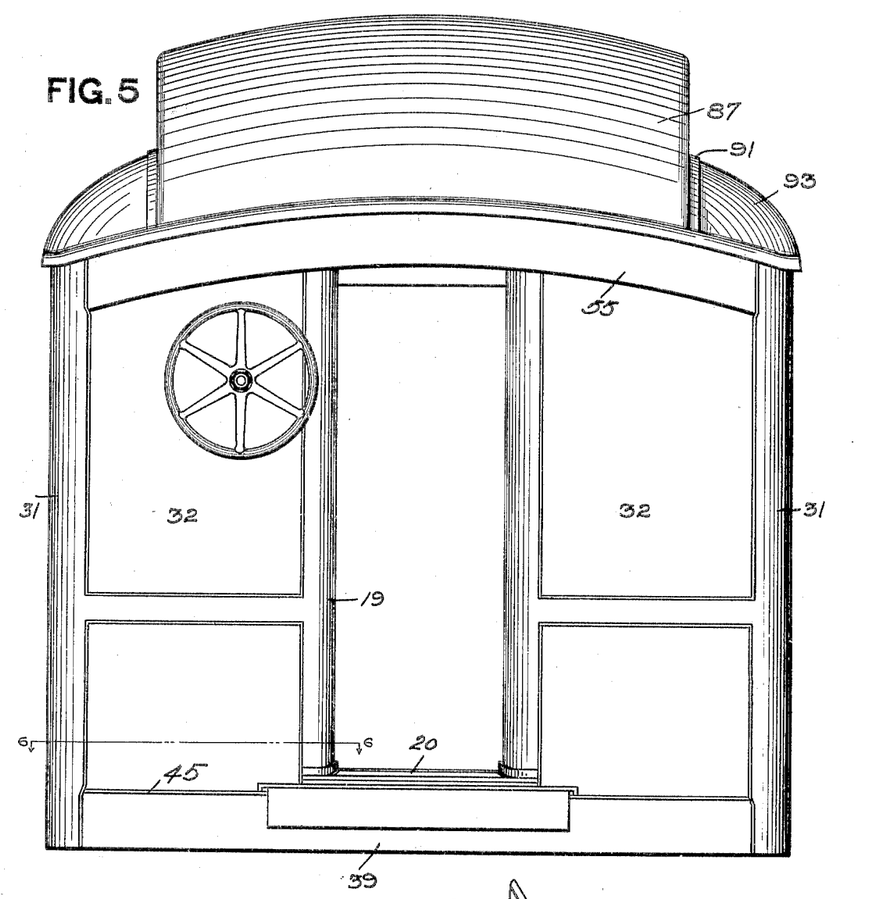
Fig. 5 is an end view of the car.
Figure 6:
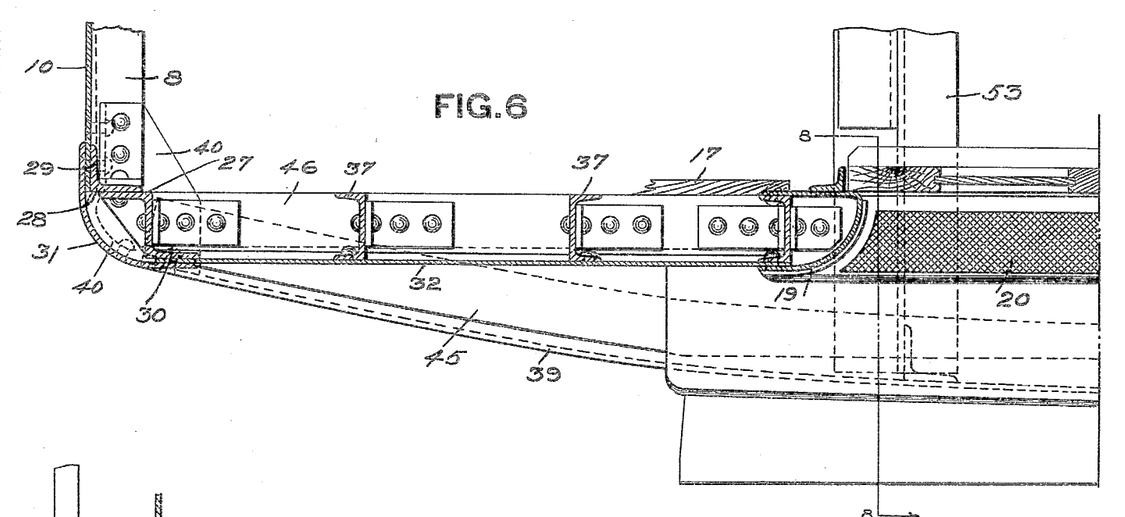
Fig. 6 is a horizontal section on the line 6 6, Fig. 5, showing the end sill and connected parts on an enlarged scale.

The end posts 37 of the car preferably are channel-bars, as shown in Fig. 6, and at the end door-openings a pressed finishing-plate 19 is riveted to the flanges of the door-posts.

Figures 8, 9, 10:
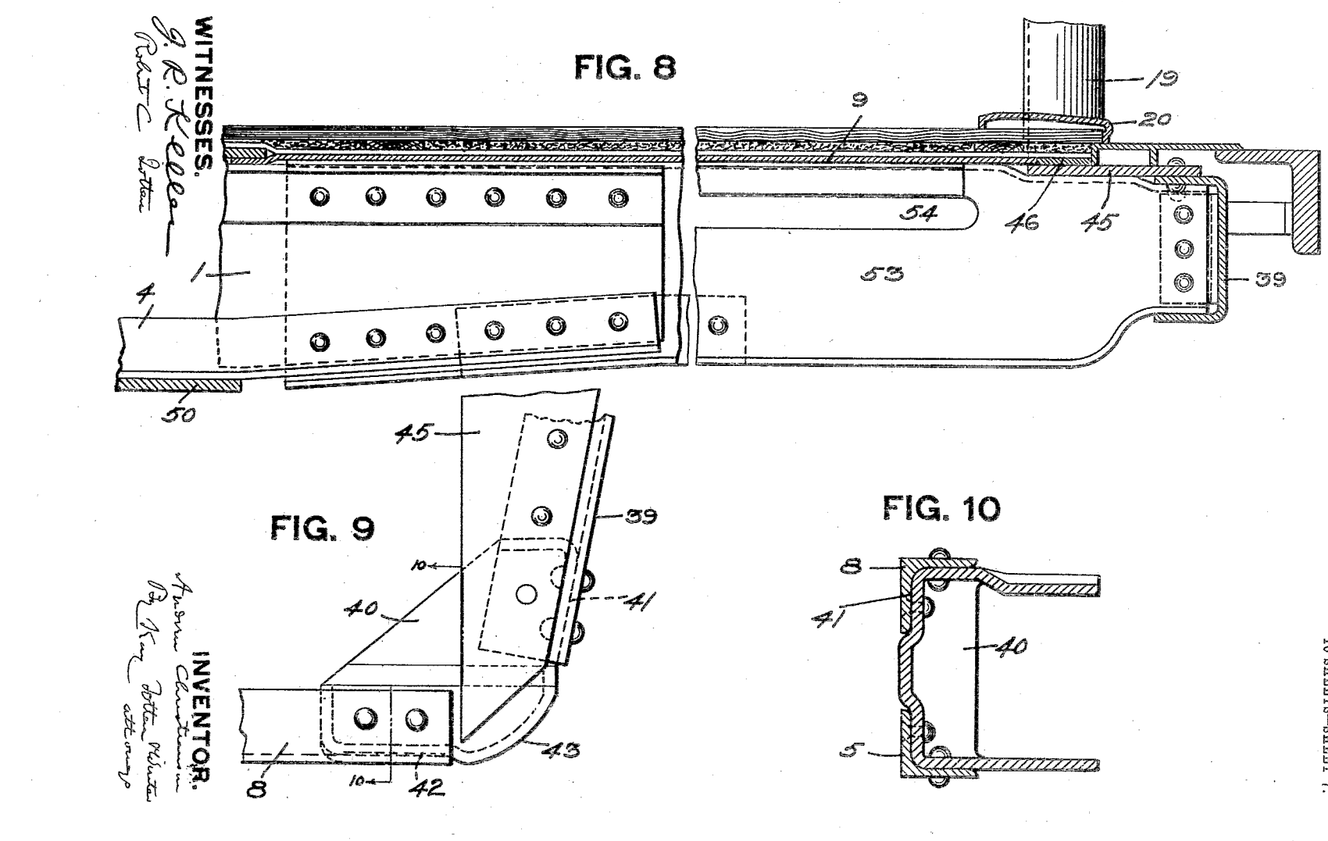
Fig. 8 is a vertical longitudinal section on the line 8 8, Fig. 3, showing the draft-sill in side view and end sill in cross-section.
Fig. 9 is a plan view showing the corner construction.
Fig. 10 is a section on the line 10 10, Fig. 9.

The end sill consists of a channel 39, which may be either rolled or pressed and is placed with its web vertical and the flanges projecting inwardly. This end sill is bowed outwardly from end to end, so as to give the curved effect to the car end and is secured to the car sides by connecting-castings or the like 40, one of these castings being shown in Figs. 9 and 10 and being provided with faces 41 and 42 at an obtuse angle to each other, the one for riveting to the car sides and the other to the end of the bowed end sill. Between these connecting-faces the corner portion of the casting is rounded, as at 43, so as to fit into the curved corner finishing-sheet 31. This corner connecting member preferably will be a hollow casting provided with the vertical connecting-faces and with top and bottom strengthening-flanges. It may, however, if desired, be formed of pressed metal. To the upper flange of the end sill is riveted a plate 45, having its outer edge curved to conform to the curvature of the end sill and having its inner edge straight. The end posts 37 may be secured directly to this plate by suitable angle or knee pieces; but preferably a strengthening-strip 46 is interposed between the plate 45 and the lower ends of the end posts.

The underframe is provided with suitable bolsters 48, which are shown as of a standard type, having web members 47 interposed between the center sills and car sides, the center brace 48 between the center sills, together with a lower tie or connecting plate 50 and a top chord, which may be composed of the metal floor-plates 9 or may be a separate piece. Between the body-bolsters the center sills are connected to the car sides by suitable transverse floor-supports 51, which are shown as sections of channel-beams connected at their ends to the center sills and car sides by suitable brackets or knee-pieces.

Two body-bolsters will be used, as is common in passenger-car constructions. The center sills extend out beyond the endmost of these body-bolsters, and the draft-sills 53 are riveted to the ends of the center sills and have their outer ends secured to the end sill by suitable connecting means. These draft-sills are preferably of Z shape in cross-section, although they may be of other designs, and are slotted, as at 54, to permit the passage of the cross connecting member of the buffer mechanism. The end sill also is provided with perforations for admitting the buffer.

Figures 11, 12, 12A:
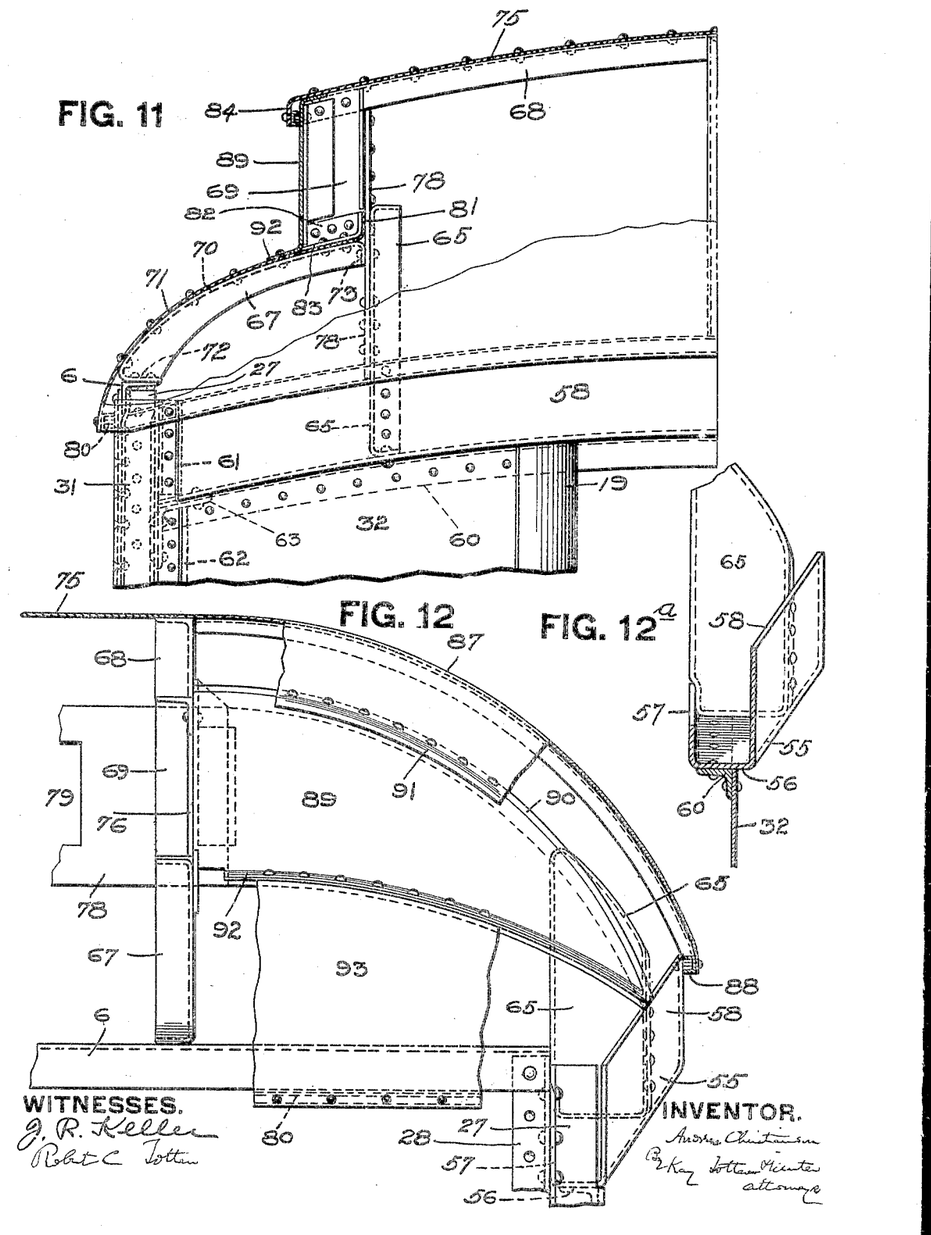
Fig. 11 is partly an end elevation and partly a cross-section on the line 11 11, Fig. 1, of the car-roof.
Fig. 12 is in part a side view and in part a longitudinal section through the end of the roof.

The end plate of the car consists of a pressed open box-like member 55, being of a modified channel shape, having the bottom web 56, comparatively shallow inner flange 57, and deep outer flange 58. This member is bowed both outwardly and upwardly, and the exterior deep flange 58 serving as a finish for the upper portion of the car end. The inner flange 57 is straight from end to end. To the lower side of web 56 of this end plate is riveted an angle-bar 60, extending across the car in a straight line vertically, but being curved upwardly to conform to the curved contour of the end plate, this angle-bar serving as a means for connecting to the end plate the upper edges of the end sheets. The ends of the end plate are secured to the corner-posts by means of knee-pieces 61 and have secured to the lower side thereof vertical stiffeners 62 by means of knee-pieces 63. The box-like end plate is stiffened by means of a pair of diaphragms 65, each being formed of a pressed plate having a vertical web and integral edge flanges. The flange at the bottom of these diaphragms serves for securing the same to the lower face or web 56 of the end plate. The inner edge of the diaphragms is substantially straight; but the outer edge is curved, as shown in Fig. 12, to fit the contour of the end hood of the car, the upper end of the diaphragm projecting a considerable distance above the upper edge of the end plate.

The roof is supported by metal carlines comprising a lower-deck section 67, an upper-deck section 68, and vertical connecting members 69. The lower-deck section is formed of a pressed plate of practically angle shape in cross-section, having one leg 70 arranged exteriorly and placed horizontally for supporting the lower-deck sheets 71 and having the other leg projecting inwardly and downwardly. The outer leg 70 is bent inwardly at its lower end at 72 for riveting to the top chord or plate 6 of the car side frame and is also bent downwardly at its inner end, as at 73. This lower-deck member is curved, as shown clearly in Fig. 11, and its lower end is somewhat wider than its upper end.

The upper-deck section 68 of the carline is of angle shape in cross-section, preferably a rolled angle having the horizontal leg placed at its upper edge for supporting the upper-deck plates 75 and being curved to the standard shape of the roof of cars of this type. The vertical connecting member 69 is angle shape in cross-section, having one leg projecting outwardly and the other leg extending longitudinally of the car and at the inside thereof. This vertical connecting member is riveted at its upper and lower ends to the vertical legs of the lower and upper deck sections 67 and 68.

A metallic plate 78 extends practically for the full length of the car, being riveted to the flanges 73 on the inner ends of the lower-deck sections 67 of the carlines and to the inner legs of the vertical members of said carlines and also to diaphragms 65 of the end plates. This plate 78 is provided with openings 79 for receiving the ventilators. The lower-deck sheets 71 are of curved contour, as shown, having their lower edges secured to the car sides through an interposed filling member 80, so as to give a cornice and finish to the upper portion of the car. At their upper edges these plates are provided with flanges 81, which are riveted to the ventilator-plate 78, and said deck-plates are slotted, so as to fit around the vertical members 69 of the carlines. A flashing member consisting of a casting 82 fits around the lower edge of the vertical member of the carline and is riveted thereto, this casting being provided with horizontal flanges 83 at its lower edge for receiving rivets passing through the deck-plates and into the horizontal flange 70 of the lower-deck member 67 of the carline. These castings securely close the joint between the deck-plate and the carline, thus preventing the entrance of water. The upper-deck plates 75 rest upon the curved upper-deck carlines 68 and have their edges turned down, as at 84, and suitably secured in place. Extending along the vertical carline members 69 at their outer edges and suitably secured in place are screen-plates 85, which may be of any desired construction.

The end hood of the car comprises an upper hood-sheet 87, extending from the end carline and being curved downwardly and having its lower edge secured to the upper portion of the end plate 55 through an interposed filling-piece 88. Side hood-plates 89 extend from the end carline to the end of the car and lie outside of said end carline, as shown in Fig. 11. These side hood-plates are provided with an inwardly-projecting flange 90, riveted to the top hood-sheet 87, the latter lying above said flange and projecting beyond the side hood-plate with its edge turned down, as at 91. At their lower edges the side hood-plates are provided with outwardly-projecting flanges 92, which are riveted to the lower hood-plates 93. The latter are curved to the desired contour and are provided at their inner edges with flanges for riveting to the ventilator-plate and have their lower edges riveted to the plates of the side frames through an interposed filling-strip, so as to give a uniform finish to the car-roof.

The foregoing comprises the essential features of construction of my car. Many of the details of finishing have been omitted, as they will be varied within wide limits to meet particular conditions or designs.

The car described is simple of construction, provided with a minimum number of parts, thus reducing riveting, and the design is flexible, permitting it to be applied to various types of cars. The design is such that the car may be provided with a metallic exterior finish and wooden interior finish or with a metallic interior finish and wooden exterior finish, or with both interior and exterior metallic finish. The car has practically the appearance of a wooden car of the same type, and the weight thereof is not materially greater.

Many parts of the design can of course be varied in details of construction without departing from the spirit of my invention.

What I claim is—

1. A metal corner-post for railway-cars comprising a vertical member having webs at right angles to each other and flanges on the edges of said webs, said flanges being at right angles to their respective webs and to each other.

2. A metal corner-post for railway-cars comprising a vertical member having webs at right angles to each other and flanges on the edges of said webs, said flanges being at right angles to their respective webs and to each other, and a metal finishing or facing strip riveted to said flanges.

3. A metal corner-post for railway-cars comprising a vertical member having webs at right angles to each other and flanges on the edges of said webs, said flanges being at right angles to their respective webs and to each other, and a curved metal finishing-strip having its edges riveted to said flanges.

4. A metal corner-post for railway-cars comprising a member Z-shaped in cross-section and a flanged bar riveted to one of its flanges with a flange projecting at right angles to the flange of the Z-bar member to which it is riveted.

5. A metal corner-post for railway-cars comprising a member Z-shaped in cross-section and having a flanged bar riveted to one of its legs with a flange projecting at right angles to said flange of the Z-shaped member, and a curved metal finishing-strip having one edge riveted to the flange of said flanged bar and its other edge riveted to the other flange of the Z-bar.

6. A metal corner-post for railway-cars, comprising a web and two flanges at the edges of said web, said flanges being at right angles to each other, and a curved facing-plate having its edges riveted to the flanges of said post.

7. A metal corner-post for railway-cars comprising a built-up flanged member having external flanges at right angles to each other for receiving an external finishing-sheet and having internal flanges also at right angles to each other for receiving lining-sheets.

8. A metal corner-post for railway-cars comprising a built-up flanged member having internal flanges at right angles to each other for receiving lining-sheets, and having external flanges also at right angles to each other, and a curved finishing-strip having its edges riveted to said external flanges.

9. In a metallic railway-car, the combination of an end sill comprising a vertical web bowed outwardly and provided with an inwardly-projecting flange at its upper edge, a plate arranged horizontally and riveted to the top flange of the said end sill and having its outer edge curved to conform to said end sill, and a floor supported on said plate.

10. In a metallic railway-car, the combination of an end sill comprising a channel-shaped member placed with its web vertically and flanges projecting inwardly and being bowed outwardly, a plate arranged horizontally and provided with a curved outer edge riveted to the top flange of said channel, and floor-plates secured to the inner edge of said plate.

11. In a metallic railway-car, the combination with the car sides, of an end sill comprising a flanged member bowed outwardly from end to end, and corner connecting members having faces at an obtuse angle to each other and riveted respectively to the car sides and end sill.

12. In a metallic railway-car, the combination with the car sides, of an end sill comprising a channel-shaped member placed with its web vertical and having flanges projecting inwardly and being bowed outwardly from end to end, and corner connecting members provided with faces at an obtuse angle to each other and riveted respectively to the car sides and end sill.

13. In a metallic railway-car, the combination of an end sill provided with flanges at its upper and lower edges, a horizontally-arranged plate secured to the upper flange of said sill, a floor supported by the inner edge of said plate, and vertical posts secured to said plate.

14. In a metallic railway-car, the combination of an end sill bowed outwardly and provided with inwardly-projecting flanges at its top and bottom edges, a horizontally-arranged plate provided with a curved outer edge secured to the top flange of said end sill, a floor supported by the inner edge of said plate, and vertical posts secured to said plate.

15. A metallic car-frame provided with door or window posts consisting of vertically-arranged channel members, and metallic facing members of trough form and having their edges riveted to the flanges of said channels.

16. A metallic car-frame provided with flanged door and window posts, and pressed metallic finishing members having their edges riveted to the flanges of said posts.

17. In a metallic railway-car, the combination with corner-posts, and an end plate secured to said posts and comprising a metallic member having bottom and front members and being curved both upwardly and outwardly.

18. In a metallic railway-car, the combination of the corner-posts, of an end plate secured to said posts and comprising a metallic channel-shaped member having a bottom face and inner and outer flanges and being curved both upwardly and outwardly.

19. In a metallic railway-car, the combination with the corner-posts, of an end plate secured thereto and comprising a bottom web, a rear flange, and a front flange of greater depth than the rear flange, said member being curved upwardly and outwardly.

20. In a metallic railway-car, the combination with the corner-posts, of an end plate secured thereto and comprising a bottom web, a front facing-flange, and a rear flange, said member being curved upwardly and the front flange and outer edge of the web also being curved outwardly.

21. In a metallic railway-car, the combination of the corner-posts and an end plate secured thereto, said end plate comprising a metallic member of open-box form, and diaphragms secured transversely of said member for stiffening the same.

22. In a metallic railway-car, the combination with the corner-posts, of an end plate therefor comprising an open-box-like member, vertically-arranged diaphragms extending transversely of said member and projecting above the same, and longitudinally-arranged plates secured to the upper ends of said diaphragms.

23. In a metallic railway-car, the combination with the corner-posts, of an end plate secured thereto and comprising an open-box-like member curved upwardly and outwardly, a flanged bar secured to the bottom thereof and curved only upwardly, and end sheets secured to said flanged bar.

24. In a metallic railway-car, the combination with the corner-posts, of a metallic end plate secured thereto and comprising a member having a bottom web and an outer facing-flange, said member being bowed upwardly and outwardly, an angle-bar secured to the bottom of said end plate and extending straight across the car, and end sheets secured to said flanged bar.

25. In a metallic railway-car, the combination with the corner-posts, of an end plate secured thereto and comprising an open-box-like member curved upwardly and outwardly, an end hood curved downwardly to meet said end plate, and diaphragms secured transversely in said end plate and projecting above the same and having curved upper edges fitting into said hood.

26. In a metallic railway-car, the combination with the corner-posts, of an end plate secured thereto and comprising a member having a bottom web and an outer facing-flange and being curved upwardly and outwardly, diaphragms secured to said end plate and projecting above the same, and a hood provided with side sheets arranged vertically and having their outer ends secured to the end plate, and longitudinally-arranged plates secured to the upper ends of said diaphragms.

27. In a metallic railway-car, the combination with the corner-posts, of an end plate secured thereto and comprising a member having a bottom web and an outer facing-flange and being curved upwardly and outwardly, of a hood curving downwardly to meet said plate, vertically-arranged diaphragms secured to said plate and projecting above the same and having curved upper edges to fit said hoods, and longitudinally-arranged plates having their upper edges curved and having their ends riveted to the upper ends of said diaphragms.

28. A metallic carline for passenger and like cars comprising an upper-deck member, lower-deck members, vertical connecting members secured to the outer ends of the upper-deck members and the inner ends of the lower-deck members, said lower-deck members comprising flanged members of curved shape and having one flange at the lower end bent inwardly for riveting to the car side frames.

29. In a metallic passenger and similar cars, the combination with the side frames and a carline connecting the same, said carline comprising an upper-deck member, lower-deck members of angle shape in cross-section having the horizontal leg arranged on its upper side and having said leg bent inwardly at the lower end and riveted to the car sides, and vertical members connecting the outer ends of the top-deck member and the inner ends of the lower-deck members.

30. In a metallic passenger and like car, the combination with the side frames provided with flanged plates at their upper edges, of a carline connecting said plates and comprising curved lower members, of pressed plates provided with integral horizontally-arranged flanges at their lower ends for attachment to the plates of the car sides, an upper-deck member, said upper and lower deck members being provided with vertical flanges, and vertical connecting members riveted directly to the vertical flanges at the inner ends of the lower-deck members and the outer ends of the upper-deck member.

31. In a metallic railway-car, the combination with the side frames, of a carline connecting the same and comprising an upper-deck member, lower-deck members having their outer ends secured to the side frames, and vertical connecting members secured to the inner ends of said lower-deck members and the outer ends of the top-deck member, said lower-deck members being provided on their inner ends with vertically-disposed flanges, and ventilator-plates secured to the vertical members of the carline and to the vertical flanges on the inner ends of the lower-deck members.

32. In a metallic railway-car, the combination with the side frames, of a carline connecting the same and comprising an upper-deck member, lower-deck members secured to the side frames, and vertical members connecting the outer ends of the upper-deck member and the inner ends of the lower-deck members, and ventilator-plates extending longitudinally of the car and secured to the vertical members of said carlines.

33. In a metallic railway-car, the combination with the side frames, of carlines connecting the same and comprising upper-deck members and lower-deck members each provided with vertical flanges, vertical connecting members riveted to the vertical flanges of said upper and lower deck members and being provided on their inner edges with flanges disposed longitudinally of the car, and ventilator-plates secured to said flanges.

34. In a metallic railway-car, the combination with the side frames, of carlines connecting the same and comprising upper and lower deck and vertical connecting members, of ventilating-plates extending longitudinally of the car and secured to said vertical connecting members, and lower-deck plates supported by the lower-deck members of the carlines and being provided with upturned flanges at their upper edges and riveted to the ventilator-plates.

35. In a metallic railway-car, the combination with the side frames, of carlines connecting the same and comprising upper-deck, lower-deck, and vertical connecting members, of deck-plates supported on the lower-deck members and being slotted at their upper edges and fitting around the vertical members of the carlines, and flashing members also fitting around said carline members and provided with outwardly-projecting flanges at their lower edges and riveted to said deck-plates.

36. In a metallic railway-car, the combination with the side frames, of carlines connecting the same and comprising upper-deck, lower-deck, and vertical connecting members, said vertical connecting members being provided on their inner edges with flanges disposed longitudinally of the car, ventilator-plates riveted to said flanges, lower-deck plates supported on the lower-deck members of the carlines and being slotted at their upper edges and fitting around said carlines and having said upper edges secured to said ventilator-plates, and flashing members fitting around said vertical carline members and provided at their lower edges with outwardly-projecting flanges riveted to said deck-plates.

37. In a metallic railway-car, the combination with the side frames, of carlines connecting the same and comprising upper-deck, lower-deck, and vertical connecting members, said lower-deck members having their outer ends secured to the side frames and being provided at their inner ends with vertically-disposed flanges, and said vertical connecting members being provided on their inner edges with flanges arranged longitudinally of the car, and plates extending longitudinally of the car and arranged vertically and riveted to the flanges of the vertical connecting members and the flanges at the inner ends of the lower-deck members.

38. In a metallic railway-car, the combination with the side frames, of carlines connecting the same and comprising upper-deck, lower-deck, and vertical connecting members, lower-deck plates supported on said lower-deck members and having their edges extending downwardly outside of the car side frames, and spacing members separate from the car sides and deck-plates and located between said car side frames and the lower edges of said deck-plates.

39. In a metallic railway-car, the combination with the side frames, of carlines connecting the same and comprising upper-deck, lower-deck, and vertical connecting members, plates riveted to said vertical members on their inner sides and extending longitudinally of the car, and vertically-arranged hood-sheets at the end of the car having their ends riveted to the outer edges of the vertical connecting members of the end carlines.

40. In a metallic railway-car, the combination with the side frames, of end plates having their ends connected to said side frames and being provided with a bottom web, and an outer facing-flange and being bowed upwardly and outwardly, vertically-arranged diaphragms secured to said end plates, carlines connecting said side frames and comprising upper-deck, lower-deck, and vertical connecting members, and longitudinally-arranged plates secured to the vertical connecting members of the carlines and having their outer ends riveted to the diaphragms of the end plates.

In testimony whereof I, the said ANDREW CHRISTIANSON, have hereunto set my hand.

ANDREW CHRISTIANSON.

Witnesses:
C. L. STEIN,
THEODORE VOGELEY.